3,115,497
3,4-DICHLORO-1,2,5-THIADIAZOLE AND ITS PREPARATION

Robert D. Vest, Wilmington, Del., assignor to E. I. du Pont de Nemours and Company, Wilmington, Del., a corporation of Delaware
No Drawing. Filed Oct. 11, 1962, Ser. No. 229,966
4 Claims. (Cl. 260—302)

This invention relates to a new thiadiazole derivative and to its preparation.

1,2,3- and 1,2,4-thiadiazoles have been known for some time. Only recently have 1,2,5-thiadiazole and certain of its derivatives been prepared (Elderfield, "Heterocyclic Compounds," vol. 7, pages 579–580; and Carmack, U.S. Patents 2,990,408 and 2,990,409). The present invention is concerned with a new and valuable derivative of 1,2,5-thiadiazole.

The product of this invention is 3,4-dichloro-1,2,5-thiadiazole, i.e. the compound of the formula

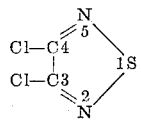

3,4-dichloro-1,2,5-thiadiazole is a stable colorless liquid with a boiling point of 85° C. at 85 mm. pressure. This compound has no flash or fire point, as determined by an open cap method, and it will not support combustion at its boiling point at atmospheric pressure (estimated 150° C.).

This new composition can be prepared economically and in good yield by reacting cyanogen with sulfur dichloride in the presence of a catalytic amount of chloride ion. This process may be pictured structurally as follows:

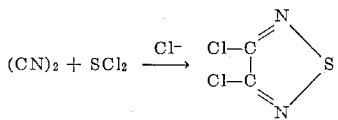

As noted by the equation, cyanogen and sulfur dichloride react in a 1:1 mole ratio. Either reactant may be present in the reaction mixture in moderate excess, e.g., 25%, but preferably they are used in a 1:1 mole ratio.

The sulfur dichloride is preferably dissolved in an organic solvent of which dimethylformamide, tetrahydrofuran, dimethylacetamide, and N-methylpyrrolidone are suitable examples. Dimethylformamide has proved especially satisfactory in producing good yields of the thiadiazole.

The chloride ion which acts as a catalyst in the above reaction can be obtained from an ionic chlorine compound, such as tetraethylammonium chloride, tetramethylammonium chloride, trimethylbenzylammonium chloride, potassium chloride, sodium chloride, and trimethylsulfonium chloride. Tetraethylammonium chloride has been found especially suitable. The catalyst can be present in the amount of 0.1 to 25 mole percent and even more, based on the amount of cyanogen used.

The reaction is normally carried out in the temperature range of −20° to 150° C. Because its exothermic nature tends to reduce yields in the higher range, a temperature range of −10° to 50° C. is preferred. The reaction can be carried out at atmospheric or superatmospheric pressures.

The following examples further illustrate the preparation and properties of 3,4-dichloro-1,2,5-thiadiazole.

Example I

A 500 ml., 3-necked flask equipped with magnetic stirrer, gas inlet tube, thermometer, and reflux condenser was charged with 42.9 g. (0.42 mole) of sulfur dichloride, 16.5 g. (0.1 mole) of tetraethylammonium chloride, and 100 ml. of dimethylformamide. The flask was cooled to about −30° C., evacuated to below 20 mm. pressure and 22 g. (0.42 mole) of cyanogen added via the gas inlet tube. The cooling bath was removed and the mixture allowed to warm slowly to about 0–10° C. Near 0–10° C. the reaction became very exothermic, requiring use of a "Dry Ice"-acetone bath. The highest temperature reached during the reaction was 90° C. The resultant bright yellow solution was cooled to room temperature, stirred for two hours, and extracted continuously with low boiling petroleum ether for four hours. The petroleum ether extracts were washed well with water, dried over sodium sulfate, and distilled. The distillate, 3,4-dichloro-1,2,5-thiadiazole, is a colorless liquid (88% yield), with B.P. of 85° C. at 82–85 mm. pressure, refractive index $n_D^{25}=1.5594$, and specific gravity of 1.642 at 25°/25°. Its ultraviolet spectrum has absorptions at $$\lambda_{max.}^{EtOH} 271$$

($\epsilon=9,500$) and 275 m$\mu$ ($\epsilon=9,150$) and the infrared spectrum has absorption maxima at 7.0, 7.6, 7.92, 9.83, 12.12, and 12.28$\mu$.

*Analysis.*—Calcd. for $C_2N_2SCl_2$: C, 15.50; H, 0.00; N, 18.07; Cl, 45.75. Found: C, 15.90; H, 0.00; N, 18.10; Cl, 44.94.

Example II

A solution of 10.2 g. (0.1 mole) of sulfur dichloride and 0.5 g. of tetraethylammonium chloride in 50 ml. of tetrahydrofuran was cooled to −80° C. and about 5.2 g. (0.1 mole) of cyanogen was added. On warming to room temperature, the red color faded to yellow. The mixture was heated to reflux (66° C.) for 1.5 hours, cooled, and concentrated to give a mixture of tetraethylammonium chloride (as a crystalline solid) and a yellow oil. Distillation of the oil under reduced pressure gave 6.7 g. of a clear liquid, B.P. 50–60 C. at 20 mm. pressure. This material was 3,4-dichloro-1,2,5-thiadiazole but had a lower degree of purity than that of Example I.

The novel thiadiazole of this invention is useful as a polymer solvent. For example, a self-supporting film of polyvinyl choride can be prepared by dissolving this polymer in 3,4-dichloro-1,2,5-thiadiazole to form a saturated solution, pouring the solution on a glass plate, evaporating the solvent, and stripping the polyvinyl chloride film from the plate. 3,4-dichloro-1,2,5-thiadiazole can also be used as a fire retardant.

As many widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. The compound of the formula

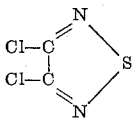

2. Process which comprises reacting, in the presence of chloride ion, cyanogen with sulfur dichloride and recovering the resultant 3,4-dichloro-1,2,5-thiadiazole.

3. Process which comprises reacting, at a temperature in the range —20° to 150° C. and in the presence of a catalytic amount of chloride ion, cyanogen with sulfur dichloride dissolved in an organic solvent, and recovering the resultant 3,4-dichloro-1,2,5-thiadiazole.

4. Process which comprises adding cyanogen to an approximately equal molar amount of sulfur dichloride dissolved in dimethylformamide, reacting said cyanogen and sulfur dichloride at a temperature in the range —10° to 50° C. and in the presence of a catalytic amount of chloride ion, and recovering the resultant 3,4-dichloro-1,2,5-thiadiazole.

No references cited.